(12) United States Patent
Jernigan

(10) Patent No.: US 9,857,173 B2
(45) Date of Patent: Jan. 2, 2018

(54) NAIL-SETTING SURVEYORS ROD

(71) Applicant: Chad Everett Jernigan, North Beach, MD (US)

(72) Inventor: Chad Everett Jernigan, North Beach, MD (US)

( * ) Notice: Subject to any disclaimer, the term of this patent is extended or adjusted under 35 U.S.C. 154(b) by 0 days.

(21) Appl. No.: 15/430,462

(22) Filed: Feb. 11, 2017

(65) Prior Publication Data

US 2017/0234683 A1 Aug. 17, 2017

Related U.S. Application Data

(60) Provisional application No. 62/295,380, filed on Feb. 15, 2016.

(51) Int. Cl.
*G01C 15/08* (2006.01)
*B25D 1/16* (2006.01)
*B25D 1/00* (2006.01)

(52) U.S. Cl.
CPC .............. *G01C 15/08* (2013.01); *B25D 1/005* (2013.01); *B25D 1/16* (2013.01)

(58) Field of Classification Search
CPC ........... B25C 3/008; B25C 3/006; B25C 3/00; B25C 7/00; B25C 9/00; B25C 1/08; B25C 5/1617; B25D 1/12; B25D 1/16; G01C 15/08
See application file for complete search history.

(56) References Cited

U.S. PATENT DOCUMENTS

| 2,002,206 A | * | 5/1935 | Kobe | E04D 1/045 52/543 |
|---|---|---|---|---|
| 3,051,425 A | | 8/1962 | Homrighausen | |
| 4,145,969 A | | 3/1979 | Gawlick et al. | |
| 4,562,948 A | * | 1/1986 | Floyd | B25C 1/02 227/113 |
| 5,181,644 A | * | 1/1993 | Ferrell | B25C 3/008 227/147 |
| 6,205,602 B1 | * | 3/2001 | Dettweiler | B25C 1/02 227/147 |
| 2010/0170366 A1 | | 7/2010 | Goeke | |
| 2015/0292590 A1 | | 10/2015 | Nowak et al. | |

* cited by examiner

*Primary Examiner* — Robert Scruggs
(74) *Attorney, Agent, or Firm* — Louis Ventre, Jr.

(57) ABSTRACT

A combination tool includes a surveyor's rod having a tubular body and a hammer that is slidable within the tubular body using an external handle. The tubular body defines an opening to insert a nail to be hammered into a surface below the tubular body. A nail-loading device may be affixed adjacent to the tubular body. The nail-loading device has a tube for receiving a nail and a lever arm that can be pivoted away from the tube to receive a nail and then pivoted back to its resting position to force the nail into the tubular body through the opening in the tubular body. A hammer-stop may be affixed to the tubular body to form a physical stop to the downward movement of the hammer. A handle lock may be employed along with a rod-tip point.

6 Claims, 4 Drawing Sheets

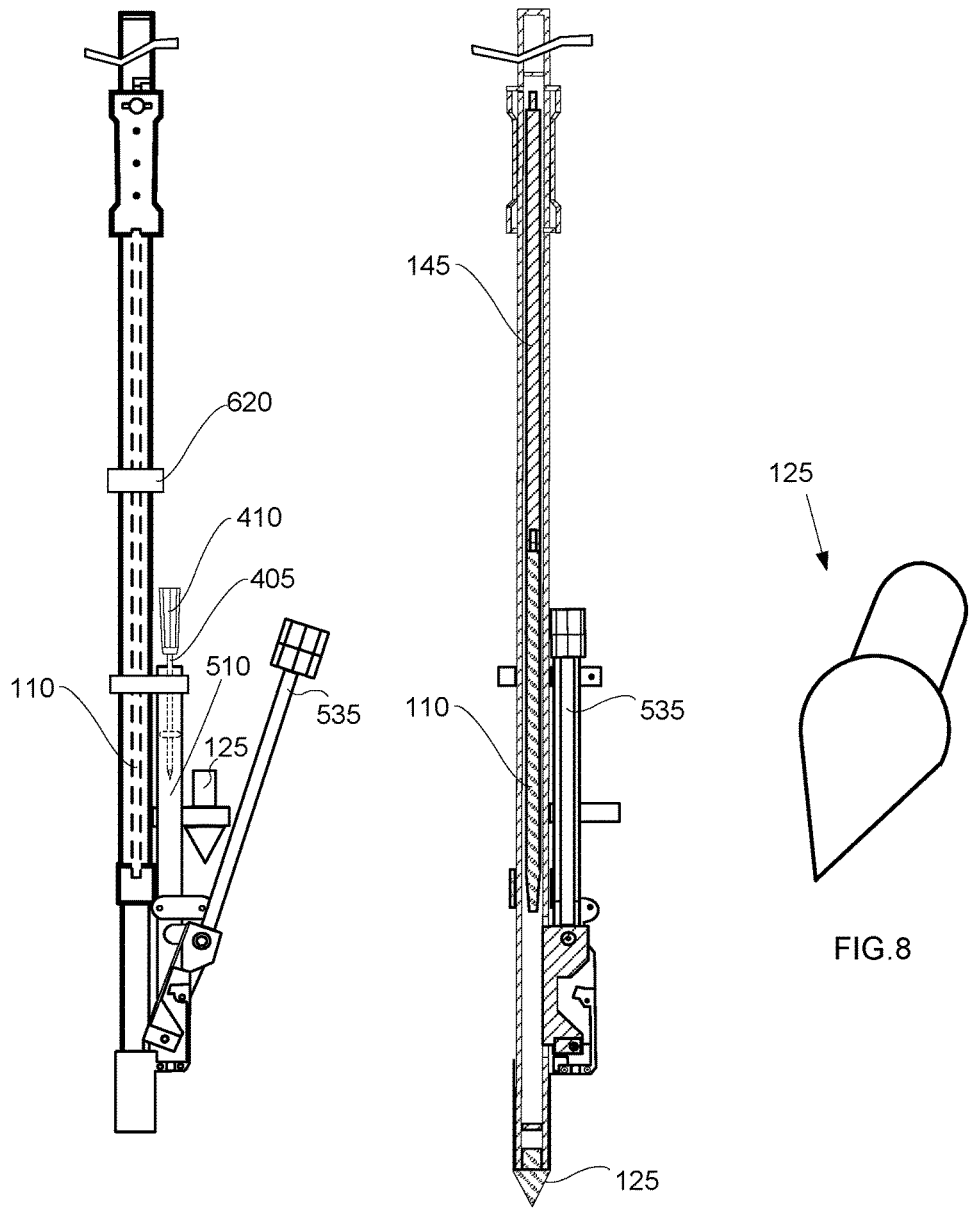

NAIL-SETTING SURVEYORS ROD

CROSS-REFERENCE TO RELATED APPLICATIONS

This application claims the benefit of U.S. Provisional Application No. 62/295,380, filed 15 Feb. 2016, which is hereby incorporated by reference herein in its entirety.

TECHNICAL FIELD

In the field of geometrical instruments, a rod useable in conjunction with a surveyor's instrument located at a point remote from the rod for measuring the vertical distance between a point at a lower level and the line of sight of the surveyor's instrument. The rod is also usable in conjunction with the surveyor's instrument to distinguish the terminal end of the line of sight.

BACKGROUND ART

A surveyor's rod as used herein is also variously known as a surveying rod, a levelling rod, a level staff, a topographer's rod, and a stadia rod. The surveyor's rod is often a graduated wooden or aluminum rod that is used with a levelling instrument to determine the difference in height between points or heights of points above a datum surface.

A surveyor's rod can be one piece, but many are sectional and can be shortened for storage and transport or lengthened for use. Aluminum rods are often telescoping so that it can be shortened by nesting its sections inside each other. Wooden rod sections can be attached to each other with sliding connections or slip joints, or hinged to fold when not in use.

Surveyor's rods are usually graduated on one or two sides. If marked on two sides, the markings can be identical or can have different units on each side, such as imperial units on one side and metric units on the other. Surveyor's rods are sometimes used to locate an object or a location with accurate survey grade locations.

Surveyor's rods sometimes have a pointed bottom end to pin point an exact vertical elevation and horizontal location on objects and on surfaces. Typically, a surveyor's rod is used to measure a distance or height from the surface it is resting on. A measurement of height enables the surveyor or user to know the elevation at the top of rod and then know the elevation at the bottom by a method of subtraction.

Other equipment may be used with the surveyor's rod, such as a survey prism. The survey prism is typically mounted atop the surveyor's rod in order to reflect a signal back to a surveying total station. A surveying total station is a surveying instrument that integrates an electronic theodolite with an electronic distance meter. The theodolite uses a movable telescope to measure angles in both the horizontal and vertical planes. Other types of equipment may be placed atop of the surveyor's rod.

SUMMARY OF INVENTION

A combination tool includes a surveyor's rod having a tubular body and a hammer that is operable within the tubular body.

The hammer is configured to slide within the tubular body using a handle mounted on the outside surface of the tubular body. The handle slides adjacent to the outer surface of the tubular body while simultaneously sliding the hammer within the inner volume.

A nail can be loaded into the tubular body through an opening in the lower portion of the tubular body. A user slides the hammer can to strike the nail and drive the nail out of the lower half.

A nail-loading device may be affixed adjacent to the tubular body. The nail-loading device has a tube for receiving a nail and a lever arm that can be pivoted to open the top end of the tube to receive a nail tube and then pivoted back to its resting position to force the nail into the tubular body through the opening in the tubular body. The nail may be adorned with a flexible plastic body to position the nail in a plumb alignment within the tubular body and to serve as a marker once the nail has been driven into the ground or other surface.

A hammer-stop may be affixed to the tubular body to form a physical stop to the downward movement of the hammer. The physical stop is preferably at a set position so that distance measurements from the top of the nail can be determined. A handle lock may be employed to prevent movement of the handle when engaged. The combination tool may include a rod-tip point that can be inserted into the lower end of the tubular body.

Technical Problem

A surveyor sometimes has need to set a nail in a surface prior to using a surveyor's rod. The nail serves to aid in measuring distances or heights from the top of the nail. Driving the nail to a set distance with respect to the surveyor's rod is not an easy task because of the physical separation of the hammer and the surveyor's rod. A tool is needed to eliminate the physical separation of the hammer and the surveyor's rod at the time of nail insertion.

Solution to Problem

The solution is a combination tool that includes a tubular surveyor's rod with a hammer that is operable within the tubular surveyor's rod. When the surveyor's rod is positioned in a vertical position, the hammer is slidable up and down using a handle on the outside surface of the surveyor's rod. The hammer is thus usable to drive a nail also within the tubular surveyor's rod downward and out of the surveyor's rod. When the hammer is fully extended in a down position the nail would have been driven to its maximum depth into an object or surface below the surveyor's rod. With the handle and the sliding hammer in the lowest operable position, the user can derive the exact height of the fixed nail head to a higher elevation of the surveyor's rod. Such operability also enables the user to know an exact elevation at the top of the nail by knowing the top elevation of the rod.

Advantageous Effects of Invention

The nail-setting surveyor's rod enables the surveyor to more efficiently set up a datum point atop a nail for an accurate measurement with the surveying rod. It saves time and effort and therefore is a means to more economically perform surveying tasks.

When used, the plastic body surrounding the nail provides two advantages: It centers the nail within the tubular body of the surveying rod prior to being driven out of the surveying rod; and it projects from the ground or other surface to serve as a marker that is easily found by the surveyor after it has been driven out of the surveying rod.

BRIEF DESCRIPTION OF DRAWINGS

The drawings illustrate preferred embodiments of the nail-setting surveyor's rod according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 6 is a side-elevation view of a nail-setting surveyor's rod with a nail shown being added to the tube of the nail loading device, the hammer in an elevated position, the lever arm rotated away from the surveyor's rod.

FIG. 7 is a sectional side-elevation view of a nail-setting surveyor's rod showing a nail with spacing components within the inner volume of the surveyor's rod at the lower end of the surveyor's rod, the hammer in an elevated position, and the rod-tip point within the inner volume of the surveyor's rod at the bottom end of the surveyor's rod.

FIG. 8 is a perspective view of the rod-tip point in isolation.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
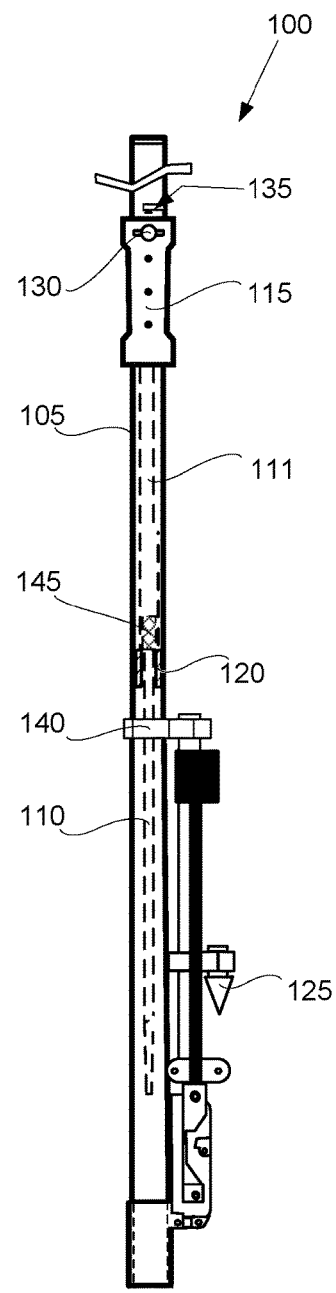
FIG. 1 is a side-elevation view of a nail-setting surveyor's rod.

FIG. 1 shows a side-elevation view of a first embodiment of a combination tool (100) comprising a surveyor's rod (105) and a hammer (110).

Figure 2:
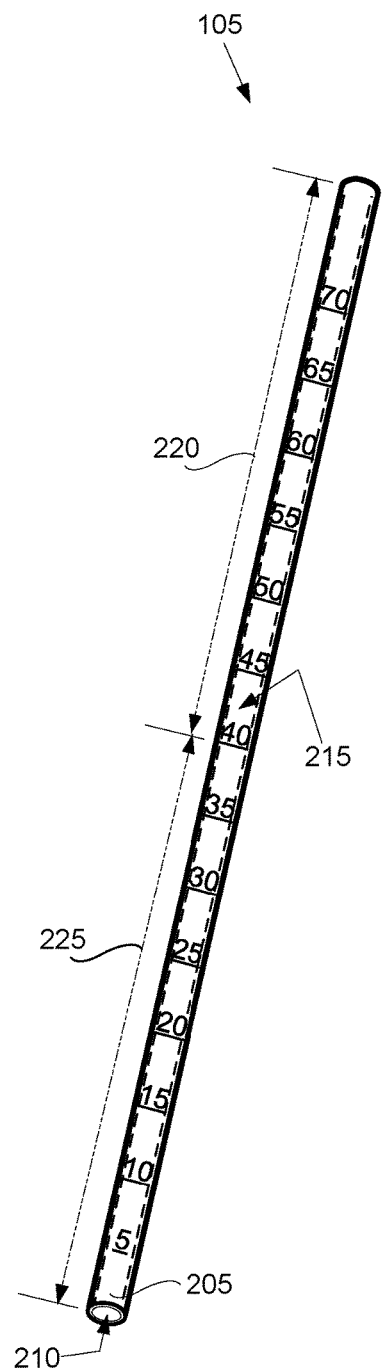
FIG. 2 is a front perspective view of a surveyor's rod.
Figure 3:
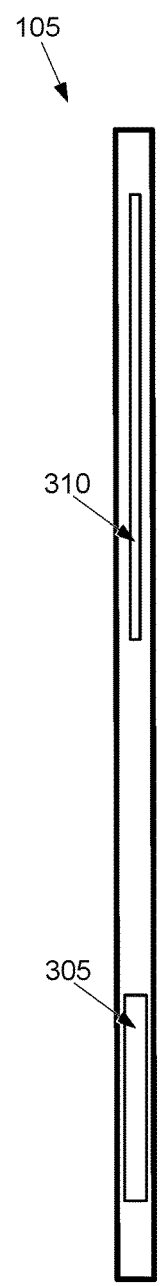
FIG. 3 is a rear elevation view of the surveyor's rod showing an opening to load a nail.
Figure 4:
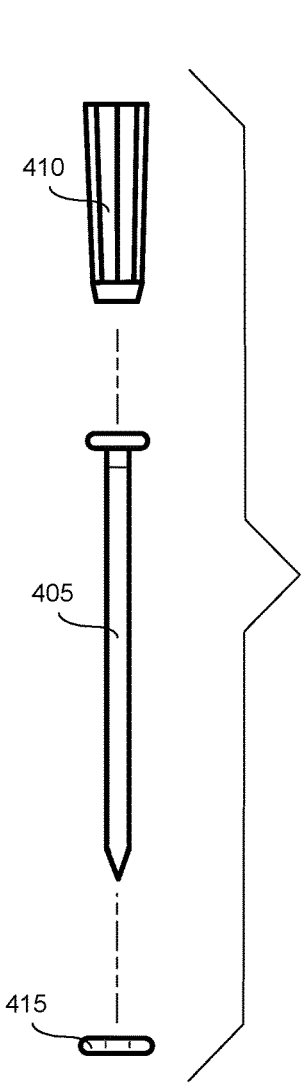
FIG. 4 is an exploded elevation view of a nail with spacing components including a plastic body at the top and a bottom-spacer.

The surveyor's rod (105) has a tubular body (205) as shown in FIG. 2 in perspective. FIG. 2 also shows some typical measuring graduations. The tubular body (205) is essentially a pipe, preferably having a uniform internal diameter running the length of the surveyor's rod (105), although variations in the internal diameter that do not interfere with the operations of the hammer (110) are within the scope of the invention. As with any such pipe, the tubular body (205) has an inner volume (210), which is defined by the internal diameter and the length the inner diameter runs along the tubular body (205). Also as with any such pipe, the tubular body (205) has an outer surface (215). When oriented vertically, the tubular body (205) has an upper half (220) and a lower half (225).

The term "hammer," as used herein, is consistent with the traditional definition in the sense that it is a tool or device that delivers a blow (a sudden impact) to an object. The hammer (110) in this invention is used to set a nail (405) into the surface immediately below the surveyor's rod (105).

The hammer (110) is situated within the inner volume (210) of the tubular body (205). The hammer (110) is preferably rod-shaped with a diameter smaller than diameter of the tubular body (205) of the surveyor's rod (105). Thus, the hammer (110) is configured to slide within the tubular body (205). Optionally, the hammer (110) may have a uniform diameter as shown in FIG. 6, or the hammer (110) may be shaped to narrow at the impact end as shown in FIG. 1 and FIG. 7, or the hammer (110) may have other varying shapes across its length as long as it can slide within the tubular body (205).

The combination tool (100), preferably, includes a handle (115) connected to the hammer (110). The handle (115) is positioned on the outside surface of the surveyor's rod (105) and is preferably connected to the hammer (110) through a handle slot (310) that penetrates from the outer surface (215) to the inner volume (210) of the tubular body (205). The handle (115) is configured to slide adjacent to the outer surface (215) of the tubular body (205) while simultaneously sliding the hammer (110) within the inner volume (210) of the tubular body (205).

A short hammer may be desired, for example, to minimize weight. If so, a rod connector (111) may be used to join the hammer (110) to a handle (115). The rod connector (111) is preferably attached to the hammer (110) using a threaded connector (145).

So that a nail (405) can be added to the inner volume (210) of the surveyor's rod (105), the tubular body (205), preferably defines a first opening (305) through the outer surface (215) to the inner volume (210). The first opening (305) is configured as to size and shape so that it can function to passage of the nail (405) into the lower half (225) of the tubular body (205). Once within the inner volume, the first opening (305) should not interfere with positioning the nail within the surveyor's rod (105) such that the hammer (110) can be slid to strike the nail (405) and drive the nail (405) out of the lower half (225).

Figure 5:
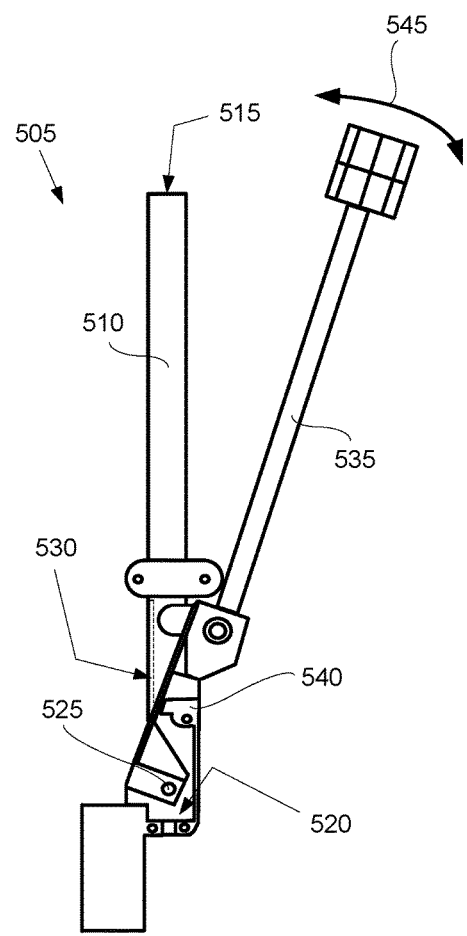
FIG. 5 is a side-elevation view of a nail-loading device in isolation with a lever arm rotated to enable nail-loading into a tube.

The combination tool (100) optionally includes a nail-loading device (505), shown in isolation in FIG. 5. Preferably, the nail-loading device (505) is removable from its attachment to the tubular body (205). Detachability allows the user to remove the nail-loading device (505) from the tubular body (205) for maintenance and for storing separately. Preferably, the tubular body (205) attaches to the rod body with a quick release mechanism, which are well known and used in ratcheting straps, snap shackles, and bicycle wheel releases to name just a few. The quick release mechanism may be used in connection with an attachment bracket (140) to secure it in a stable position.

The nail-loading device (505) is affixed adjacent to the tubular body (205), preferably using an attachment bracket (140). The nail-loading device (505) is a potential means to mechanically load individual nails into the surveyor's rod (105). The nail-loading device (505) includes a tube (510) and a lever arm (535). The tube (510) defines an open top-end (515), a bottom end (520), and a second opening (530) positioned to adjoin the first opening (305) in the tubular body (205). When present, the nail (405) is loaded into the tubular body (205) of the surveyor's rod (105) using the nail-loading device (505).

The open top-end (515) of the tube (510) is configured to receive the nail (405) and to convey the nail (405) to a position aligned with the second opening (530). The tube (510) is preferably configured to convey the nail (405) by gravity to the nail's position in alignment with the second opening (530) in the surveyor's rod (105). Because the nail (405) may be adorned with a plastic body (410) and/or a bottom-spacer (415) as aids in holding the nail (405) in alignment within the surveyor's rod (105), the tube (510)

may also be configured to permit the nail (405) with the plastic body (410) and/or the bottom-spacer (415) to be pushed into the tube (510) to its loading position using a ramrod. The tube (510) with this design would be configured to compress the plastic body (410) and/or a bottom-spacer (415) against the nail (405) so that the nail (405) can more easily pass through the second opening (530) in the tube (510) and thence through the first opening (305) in the surveyor's rod (105).

The nail-loading device (505) preferably includes the lever arm (535) that is attached with a pinned joint (525), also referred to as a "lever pivot." Motion of the lever arm (535) about the pinned joint (525) is indicated by the double arrow (545) in FIG. 5. The pinned joint (525) is operable to permit the lever arm (535) to be pivoted away from the tube (510). Preferably, the lever arm (535) covers the top end of the tube (510) when in the storage position aligned with the tube (510), as shown in FIG. 7. Preferably, the lever arm (535) exposes the open top-end (515) when pivoted away from the tube (510), as shown in FIG. 6. FIG. 1 illustrates an embodiment where the lever arm (535) does not cover the open top-end (515) of the tube (510). The pinned joint (525) is further operable to permit the lever arm (535) to be pivoted toward the tube (510) to restore the lever arm (535) to a storage position adjacent to the surveyor's rod (105).

The lever arm (535) is configured, i.e. is operable, to push the nail (405) out of the second opening (530) through the first opening (305) and into the inner volume (210) of the tubular body (205) when the lever arm (535) is pivoted back towards the tubular body (205). Preferably, the lever arm (535) pushes the nail (405) by force into the tubular body (205) so that the nail (405) is set in place in the centerline of the tubular body (205).

The mechanism enabling the lever arm to push the nail (405) is, preferably, a simple bar (i.e. a physical extension of the bracket holding the lever arm (535)) that extends from a bracket holding the lever arm (535) through the second opening (530). This arrangement is shown in the closed position in FIG. 7, where the bracket extends through the second opening (530) and into the first opening (305) to align with the inner wall of the surveyor's rod (105). When the lever arm (535) is rotated away from the tube (510) the bar is withdrawn from the second opening (530) a sufficient distance to allow the nail (405) to be positioned next to the second opening (530). When the lever arm (535) is rotated toward the tube (510) the bar pushes the nail (405) out of the tube (510) through the second opening (530) and thence into the surveyor's rod (105) through the first opening (305).

The combination tool (100) optionally includes a plastic body (410) capable of being slid on the nail (405). The plastic body (410) is preferably constructed to permit it to be slid on the nail (405) from the pointed and to bottom out on the underside of the head of the nail (405), as shown in the nail (405) in FIG. 6.

Preferably, the plastic body (410) is configured with feathery strips. When present, the feathery strips preferably extend upward from the bottom of the plastic body and can be compressed to nearly the same diameter of the nail (405) or can flex outward to a diameter that enables the feathery strips to press up against the inside wall of the surveyor's rod (105).

The plastic body (410) serves two purposes. A first such purpose for the plastic body (410) is to position the nail (405) in a plumb alignment within the inner volume (210) of the tubular body (205). And, once the nail (405) is driven into the surface below the surveyor's rod, the plastic body (410) also serves as an obvious visual marker that is easily found to identify where the nail (405) is in the surface.

The combination tool (100) optionally includes a bottom-spacer (415), also preferably made of plastic. Preferably, the bottom-spacer (415) is similar to a washer that can be tightly slid on the nail (405) from the nail's pointed end. The bottom-spacer (415) surrounds the nail (405), preferably towards the bottom of nail (405) so as to provide a second means to plumb the nail (405) against the inner wall of the tubular body (205) when the bottom-spacer (415) is within the surveyor's rod (105).

Figure 9:
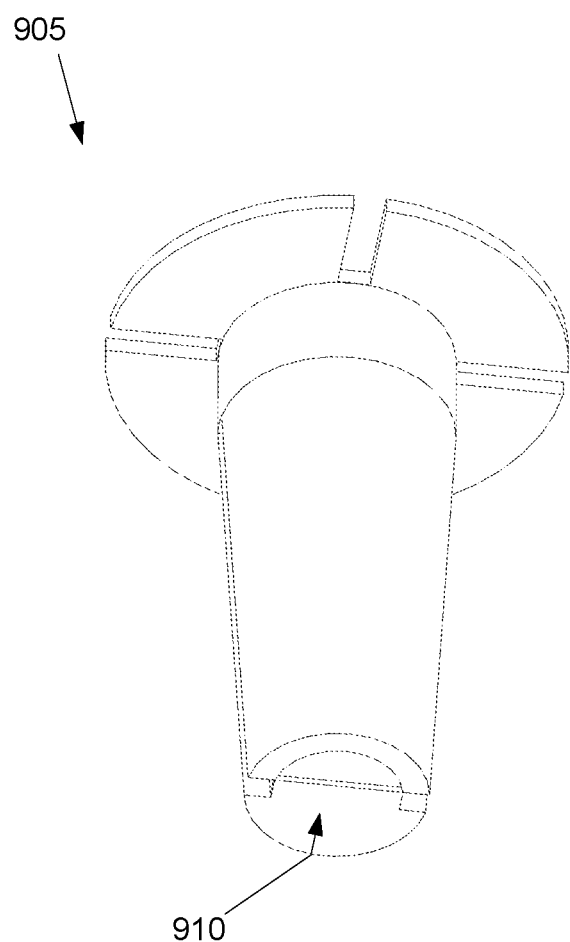
FIG. 9 is a perspective of an alternative bottom-spacer for the nail having a partially closed end.

An alternative bottom-spacer (905) is shown in FIG. 9, which may be described as a washer capping a lower extension. The alternative bottom-spacer (905) is installed by inserting the nail (405) through the top, where the nail (405) is pushed into the lower extension until the nail (405) reaches the partially closed end (910) at the bottom of the alternative bottom-spacer (905). The partially-closed end prevents the alternative bottom-spacer (905) from shifting upward on the nail (405) when the nail is slid downwards within the tubular body (205) to be positioned for hammering out of the surveyor's rod (105).

Preferably, the internal side wall of the alternative bottom-spacer (905) is tapered from top to the bottom. Preferably, the diameter at the top of the alternative bottom-spacer (905), as shown in FIG. 9, is larger than the diameter at the bottom. Such tapering allows the alternative bottom-spacer (905) to compress against the nail (405) and prevents the alternative bottom-spacer (905) from falling off of the nail (405) prior to installation within the surveyor's rod (105).

The combination tool (100) may include a hammer-stop (120) affixed to the tubular body (205). The hammer-stop (120) is configured to prevent sliding the hammer (110) below a set position when the tubular body (205) is oriented vertically. The hammer-stop (120) may be affixed on the outer surface (215) of the tubular body (205), as shown in FIG. 2, or it may be within the tubular body (205).

For embodiments that utilize a rod connector (111) between the handle (115) and the hammer (110), as shown in FIG. 1, the hammer stop (120) is preferably an adjustable barrier within the inner volume (210) affixed against the inner wall of the tubular body (205). For such embodiments, the hammer-stop (120) is preferably configured as an elongated washer with a central hole that permits the hammer (110) to freely traverse through it, but prevents downward travel of the rod connector (111).

For embodiments that do not utilize a rod connector (111), an alternative hammer-stop (620) is preferably affixed to the outer surface (215) of the tubular body (205) where it prevents downward movement of the handle (115) past the adjustable barrier. Since the handle (115) is affixed to the hammer (110), prevention of the downward movement of the handle (115) also prevents downward movement of the hammer (110).

The combination tool (100) optionally includes a rod-tip point (125), which is shown in FIG. 1 and in FIG. 6 in a storage position and is shown installed in the bottom end of the tubular body (205) in FIG. 7.

The rod-tip point (125) is configured to be inserted into the inner volume (210) at the lowest extremity in the lower half (225) of the tubular body (205). This rod tip point (125) would typically be inserted into the lowest extremity of the tubular body (205) after the nail (405) has been hammered into the surface below the surveyor's rod (105). The rod-tip point (125) is used as a positioning means to rest the surveyor's rod (105) on the center head of the nail (405).

The combination tool (100) optionally includes a handle lock (130) configured to prevent movement of the handle (115) when engaged. The handle lock (130) is preferably a simple lever that has a handle that turns a bar into a locking-aperture (135) in the tubular body (205) to prevent sliding the handle (115).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the surveying industry.

What is claimed is:

1. A combination tool comprising a surveyor's rod and a hammer;
    the surveyor's rod comprising a tubular body, the tubular body comprising an inner volume and an outer surface, and when oriented vertically, the tubular body further comprises an upper half and a lower half, the tubular body defining a slot from the outer surface through to the inner volume, the slot extending from below a top end of the tubular body and within the upper half of the tubular body;
    the hammer situated within the inner volume of the tubular body, the hammer configured to slide within the tubular body;
    the combination tool further comprising a handle connected to the hammer through the slot;
        the handle configured to slide adjacent to the outer surface of the tubular body while simultaneously sliding the hammer within the inner volume; and
    the tubular body defining a first opening through the outer surface to the inner volume, the first opening located above the bottom end of the tubular body, the first opening configured to receive a nail in the lower half of the tubular body such that the hammer can be slid to strike the nail and drive the nail out of the lower half.

2. The combination tool of claim 1, further comprising a nail-loading device, the nail-loading device affixed adjacent to the tubular body,
    the nail-loading device comprising a tube and a lever arm;
        the tube defining an open top-end, a bottom end, and a second opening positioned to adjoin the first opening in the tubular body;
        the open top-end of the tube configured to receive the nail and to convey the nail to a position aligned with the second opening;
        the lever arm attached with a pinned joint such that the lever arm can be pivoted away from the tube;
        the lever arm configured to push the nail out of the second opening through the first opening and into the inner volume of the tubular body when the lever arm is pivoted back towards the tubular body.

3. The combination tool of claim 1, further comprising a plastic body surrounding the nail, the plastic body configured to be slid on the nail.

4. The combination tool of claim 1, further comprising a hammer-stop affixed to the tubular body, the hammer-stop configured to prevent sliding the hammer below a set position when the tubular body is oriented vertically.

5. The combination tool of claim 1, further comprising a rod-tip point, the rod-tip point configured to be inserted into the inner volume in the lower half of the tubular body.

6. The combination tool of claim 1, further comprising a handle lock configured to prevent movement of the handle when engaged.

* * * * *